(12) United States Patent
Souza

(10) Patent No.: US 11,865,819 B2
(45) Date of Patent: Jan. 9, 2024

(54) PLASTIC BARRIER LAMINATE WITH AN AT LEAST PARTIALLY CRYSTALLIZED LAYER AND WITH A PIGMENTED LAYER

(71) Applicant: Huhtamaki Flexible Packaging Germany GmbH & Co. KG, Ronsberg (DE)

(72) Inventor: Mayara Souza, Parnamirim-RN (BR)

(73) Assignee: Huhtamaki Flexible Packaging Germany Gmbh & Co. KG, Ronsberg (DE)

( * ) Notice: Subject to any disclaimer, the term of this patent is extended or adjusted under 35 U.S.C. 154(b) by 0 days.

(21) Appl. No.: 17/948,321

(22) Filed: Sep. 20, 2022

(65) Prior Publication Data
US 2023/0141182 A1 May 11, 2023

(30) Foreign Application Priority Data

Nov. 6, 2021 (EP) ..................... 21206820
Dec. 1, 2021 (EP) ..................... 21211811

(51) Int. Cl.
| | | |
|---|---|---|
| B32B 27/08 | (2006.01) | |
| B32B 1/08 | (2006.01) | |
| B32B 27/20 | (2006.01) | |
| B32B 27/32 | (2006.01) | |

(52) U.S. Cl.
CPC ........... *B32B 27/08* (2013.01); *B32B 1/08* (2013.01); *B32B 27/20* (2013.01); *B32B 27/32* (2013.01); *B32B 2250/242* (2013.01); *B32B 2264/201* (2020.08); *B32B 2270/00* (2013.01); *B32B 2307/4026* (2013.01); *B32B 2307/7244* (2013.01); *B32B 2439/40* (2013.01); *B32B 2597/00* (2013.01)

(58) Field of Classification Search
CPC B32B 27/08; B32B 1/08; B32B 27/20; B32B 27/32; B32B 2250/242; B32B 2264/201; B32B 2270/00; B32B 2307/4026; B32B 2307/7244; B32B 2439/40; B32B 2597/00
See application file for complete search history.

(56) References Cited

U.S. PATENT DOCUMENTS

| | | |
|---|---|---|
| 5,342,868 A | 8/1994 | Kimura et al. |
| 5,981,636 A | 11/1999 | Amos et al. |
| 6,559,971 B1 | 5/2003 | Watts et al. |
| 2009/0029182 A1 | 1/2009 | Aubee et al. |
| 2016/0339663 A1 | 11/2016 | Clare |
| 2020/0024021 A1 | 1/2020 | Agerton et al. |

OTHER PUBLICATIONS

European Search Report for corresponding EP 21 211 811.1 dated Apr. 25, 2022, 6 pgs.
Seven, Karl M.; Cogen, Jeffrey M.; Gilchrist: "Nucleating Agents for High-Density Polyethylene—A Review", in Polymer Engineering and Science, 2016, pp. 1 to 14.

*Primary Examiner* — Michael C Miggins
(74) *Attorney, Agent, or Firm* — Rankin, Hill & Clark LLP

(57) ABSTRACT

A plastic barrier laminate having at least one at least partially crystallized layer containing polyethylene and a nucleating agent, and at least one pigmented layer containing polyethylene and a portion of flake-shaped pigments, wherein the portion of pigments is in the range from 1.5% by weight to 5.0% by weight relative to the weight of the at least one pigmented layer.

20 Claims, 3 Drawing Sheets

PLASTIC BARRIER LAMINATE WITH AN AT LEAST PARTIALLY CRYSTALLIZED LAYER AND WITH A PIGMENTED LAYER

This application claims priority in European Patent Application EP 21 206 820.9 filed on Nov. 6, 2021 and European Patent Application EP 21 211 811.1 filed on Dec. 1, 2021, which are both incorporated by reference herein.

The present invention relates to a plastic barrier laminate. The plastic barrier laminate is a multilayer laminate comprising at least two plastic layers. Preferably the plastic barrier laminate is suitable to contribute to form a flexible tube container as it is known to package beauty care products and health care products, like toothpaste, hair dyes, aesthetic and/or medical ointments, to name but a few examples.

BACKGROUND OF THE INVENTION

From WO 2009/012565 A1 a multilayer barrier laminate is known that is intended to be used in packaging of dry foods, like crackers and breakfast cereals. The multilayer barrier film discussed in this document in its most basic configuration has a core layer and two skin layers. The core layer consists of a blend of two high density polyethylene (HDPE) materials of different melt index values and a nucleating agent. The melt index value of the HDPE material with the higher melt index value is at least 50%, preferably 1000% greater than the melt index value of the other HDPE material. Melt index values according to the teachings of WO 2009/012565 A1, as well as according to the present application, is to be determined according to ASTM D 1238.

The HDPE materials used for the core layer of WO 2009/012565 A1 must have a minimum density of 0.950 g/cm$^3$ or 950 kg/m$^3$ as determined by ASTM D 1505. The material of the core layer contains a portion in the range of 10% to 70% by weight of the HDPE material with the lower melt index, and contains a portion in the range of 90% to 30% by weight of the HDPE material with the higher melt index.

The nucleating agent in the HDPE blend of the core layer material changes the crystallization behavior of the HDPE blend as the blend is cooled towards an increased crystallization.

Among the existing nucleating agents there are certain "barrier nucleating agents", mostly organic nucleating agents, which effect an increased crystallization of the polymer material and along with the increased crystallization effect a reduced moisture vapor transmission rate (MVTR).

A simplified theory behind the increase in MVTR barrier properties, i. e. in reducing the moisture vapor transmission rate of a certain polymer layer by an increase of its crystallization, is that crystallization in polymers leads to local alignment of the polymer molecular chains into thin lamellae or crystallites. The nucleating agents provide nuclei as starting points for this local alignments and thereby promote crystallization as compared to the same state of the polymer in absence of nucleating agents. As these crystallites grow during the cooling phase of the polymer, the crystallites combine to form spherulites, which are approximately spherically shaped clusters of crystallinity that grow radially from each nucleation point during crystallization. Within a spherulite there are layers of oriented lamellae which are separated by non-crystallized amorphous regions. Spherulites grow until their outer front surface encounters an obstacle, which in practice usually is a neighboring spherulite. It is believed that these aligned molecular chains in the spherulites provide physical barriers to molecules against transmission through the polymer.

Consequently, such crystallization-based polymer barrier layers provide barrier properties not only with respect to moisture vapor transmission, but also with respect to gas transmission, in particular oxygen transmission, and also with respect to migration of fatty substances.

For more insight into the kinetics of polymer crystallization and the effect of polymer crystallization on the barrier properties of the polymer reference is made to Seven, Karl M.; Cogen, Jeffrey M.; Gilchrist: "Nucleating Agents for High-Density Polyethylene—A Review", in Polymer Engineering and Science, 2016, pages 1 to 14.

SUMMARY OF THE INVENTION

It is an object of the present invention, to provide a reliable plastic barrier laminate, preferably suitable as a tube laminate for forming flexible tube packages, that has further improved barrier properties and that is preferably easy to recycle.

The present invention solves this object by a plastic barrier laminate that comprises at least one at least partially crystallized layer containing polyethylene and a nucleating agent, and that further comprises at least one pigmented layer containing polyethylene and a portion of flake-shaped pigments, wherein the portion of pigments is in the range from 3.0% by weight to 8.0% by weight relative to the weight of the at least one pigmented layer.

Experiments have surprisingly shown that the combination of an at least partially crystallized polyethylene layer with a further polyethylene layer containing flake-shaped pigments leads to a surprisingly high barrier of the thus composed laminate against gas, in particular oxygen, transmission as well as against moisture, in particular water, vapor transmission. In order to ensure an adequate structure of crystallization, a barrier nucleating agent in the meaning of the above-cited WO 2009/012565 A1 is used.

Such possible barrier nucleating agents are the cyclic organic structures as disclosed in U.S. Pat. No. 5,981,636 and salts thereof, such as disodium bicyclo [2.2.1] heptane dicarboxylate, the separated versions of the structures disclosed in the same U.S. Pat. No. 5,981,636, the salts of certain cyclic dicarboxylic acids with a hexahydrophtalic acid structure as disclosed in U.S. Pat. No. 6,559,971, and phosphate esters posed in U.S. Pat. No. 5,342,868. Commercially available possible barrier nucleating agents are sold under the tradenames "NA-11" or "ADK STAB NA-11", respectively, and "NA-21" or "ADK STAB NA-21", respectively, by Adeka Corporation in Japan, or nucleating agents sold under the tradenames "UltraGuard™ Solutions" and "Hyperform® HPN-20E" by Milliken Chemical Company in USA. The presented list is only exemplary.

As flake-shaped pigments, flake-shaped silver-colored pigments commercially available under the tradename "FauxFoil™" by Ampacet Corporation, USA, have proved to be particularly useful to obtain the described effect of barrier enhancement. These pigments are available as a master batch. However, the mode of addition of the pigments to the polyethylene material is not restricted to using a master batch.

Due to the standing technical effect of outstanding barrier enhancement the above-mentioned flake-shaped pigments of silver color of the Ampacet Corporation are the preferred flake-shaped pigments to be used in the pigmented layer.

Basically any oxygen barrier material that may serve as a pigment or pigment carrier and that allows to form flake- or platelet-shaped, which is a synonym for "flake-shaped", objects can be used to form the flake-shaped pigments according to the present application. Such possible materials are inorganic, in particular ceramic, materials. A possible material is layered silicate, sometimes also termed "layered sheet silicate". Graphite, which has an intrinsic planar molecular structure is also a possible material to form flake- or platelet-shaped pigments.

The entire flake or platelet may contain or be formed of one or more of an oxygen barrier material. If the flake or platelet is layered, it is sufficient to form one of the layers of the flake or platelet out of such an oxygen impermeable material, like silicate, graphite or other ceramics or inorganic materials that are known as oxygen barrier materials. One easy and therefore economical way to form a pigment flake or platelet as an oxygen barrier, is to coat the pigment flake or platelet with one or more inorganic material or materials. A basically possible inorganic oxygen barrier material that can be used to form flake-shaped pigments or at least to contribute to their formation is silicon oxide $SiO_x$, preferably amorphous silicon oxide. Silicon oxide can for example be deposited on flake-shaped pigment carrier substrates by vapour deposition.

The oxygen barrier material can comprise or be an organic hybrid polymer, such as an epoxy-modified silane, an amino-modified silane, a metal alcoholate, in particular an aluminum or zinc alcoholate, or tetraalkoxisilane.

The flake- or platelet-shaped pigments may be nanoparticle pigments, i. e. with a dimension along the flake's or platelet's main direction of extension in a range of 5 to 999 nm. However, the flake- or platelet-shaped pigments need not be nanoparticles. They may as well exhibit a dimension along the flake or platelet main direction of extension in the micrometer range, for example from 1 to 200 μm. It is however to be observed, that the dimension of a flake- or platelet-shaped pigment along the flake or platelet main direction of extension is at least by a factor of 2 shorter than the thickness of the pigmented layer containing the flake- or platelet-shaped pigments.

For the barrier properties of the plastic barrier laminate the sequence of arrangement of the at least one at least partially crystallized layer and the at least one pigmented layer is irrelevant.

An example of a plastic barrier laminate is formed of an at least partially crystallized layer of HDPE as polyethylene of 97% by weight relative to the entire at least partially crystallized layer and 3% by weight relative to the entire at least partially crystallized layer, with a thickness of 110 μm, a pigmented layer comprising 40% by weight of HDPE and 47% by weight of MDPE as polyethylene and 5% by weight relative to the entire pigmented layer of the above-mentioned "FauxFoil™" master batch, the remaining weight percentage points missing to complete 100% being matrix material of the "FauxFoil™" master batch, said matrix material optionally being LLDPE, with a thickness of 90 μm, and an intermediate bonding layer of polyethylene sandwiched between the at least partially crystallized layer and the pigmented layer with a thickness of 20 μm. This exemplary plastic barrier laminate has in laboratory tests shown to provide a water vapor transmission rate of 0.76 g/(m²·d) according to ASTM F 1249-01 in a test environment of 38° C. and 90% relative humidity, and has further shown to provide an oxygen transmission rate of 0.09 cm³/(m²·d) according to ASTM D 3985-02, in a test environment of 23° C. and 0% relative humidity.

The content of nucleating agent in the at least one at least partially crystallized layer preferably amounts to at least 1.5% by weight, more preferably to at least 2.5% by weight of the nucleating agent relative to the entire weight of the partially crystallized layer. Moreover, the content of nucleating agent in the at least one at least partially crystallized layer preferably does not exceed 5%, more preferably does not exceed 4% by weight of the nucleating agent relative to the weight of the partially crystallized layer. Within the above range an optimum result can be expected in the range of 2.8% by weight to 3.2% by weight of the nucleating agent relative to the weight of the partially crystallized layer.

Preferably at least 50%, more preferably 60% of the polyethylene content, still more preferably at least 75% of the polyethylene content, even still more preferably at least 85% of the polyethylene content of the at least one at least partially crystallized polyethylene layer are crystallized.

In order to further enhance the barrier properties of the plastic barrier laminate, the plastic barrier laminate may contain at least two at least partially crystallized layers, each of these layers containing polyethylene and a nucleating agent, preferably according to the specifications set forth above and/or below. It has shown to be particularly advantageous, if in the presence of more than one at least partially crystallized layer at least one of the at least one pigmented layer is arranged between the at least two at least partially crystallized layers.

This does not exclude the presence of pigmented layers outside the spatial area between two at least partially crystallized layers, but preferably at least two at least partially crystallized layers sandwich at least one of the at least one pigmented layer between them.

Additionally or alternatively, for the same purpose of further enhancing the barrier properties of the plastic barrier laminate, the plastic barrier laminate may contain at least two pigmented layers, each of these pigmented layers containing polyethylene and a portion of flake-shaped pigments, preferably according the specification given above and/or in the following.

The portion of the flake-shaped pigments preferably ranges from 3.0% by weight to 8.0% of weight relative to the weight of the respective pigmented layer. At least one of the at least one at least partially crystallized layer can be arranged between the at least two pigmented layers.

Consequently, in case more than one at least partially crystallized layer and more than one pigmented layer is provided, some or all of the at least partially crystallized layers and some or all of the pigmented layers can be arranged in an interlaced fashion with at least one at least partially crystallized layer being arranged between two pigmented layers and with at least one pigmented layer being arranged between two at least partially crystallized layers.

In order to improve the recyclability of the at least one pigmented layer, the at least one pigmented layer, except for inevitable impurities, only contains polyethylene and flake-shaped pigments.

Since unmodified regular HDPE as polyethylene material has already increased MVTR and OTR barrier properties over polyethylene material of lower densities, preferably the polyethylene material in the pigmented layer contains or is high-density polyethylene, i. e. polyethylene with a density in the range of 0.941 to 0.970 g/cm³, that preferably has a melt index in the range of 0.3 to 8.5 g per 10 min.

Alternatively or additionally the polyethylene material of the at least one pigmented layer can comprise or be medium density polyethylene (MDPE) with a density in the range of 0.930 to 0.940 g/cm$^3$.

Preferably at least 90% by weight of at least one pigmented layer, preferably of all pigmented layers, in the plastic barrier laminate is formed of one the above polyethylene material options mentioned for the pigmented layer.

All density values given in the present application for polyethylene or other polymer materials are meant to be determined according to ASTM D 1505. Likewise, all melt index values given in the present application for polyethylene or other polymer materials are meant to be determined according to ASTM D 1238.

Consequently, in more general terms, at least one of the at least one pigmented layer may contain two different types of polyethylene which differ in their density, like a blend of HDPE and MDPE.

Consequently, in case there is a plurality of pigmented layers within the plastic barrier laminate, at least two pigmented layers, optionally all pigmented layers, may contain the same type of polyethylene. Alternatively to different pigmented layers may contain two different types of polyethylene which differ in their density.

Preferably the at least one pigmented layer and/or at least one at least partially crystallized layer is formed by a blown film process or by a cast film process.

A single pigmented layer can have a thickness in the range from 10 to 200 μm. Preferably, at pigmented film may be used that is composed of a plurality, i. e. two or more single pigmented layers, if a pigmented layer of the thickness larger than 40 μm is desired. The plurality of single pigmented layers may be coextruded to form the pigmented film, with each single pigmented layer having a thickness in the range of 10 to 30 μm, preferably in the range of 12 to 20 μm.

Consequently, in more general terms, the plastic barrier laminate may contain a plurality of pigmented layers, wherein the plurality of pigmented layers are arranged immediately subsequent to one another in a stacking direction of the plastic barrier laminate, in which the layers of the plastic barrier laminate are stacked to form the multi-layer plastic barrier laminate.

In case the plastic barrier laminate contains more than one pigmented layer, each of these pigmented layers is preferably realized according to the above specification.

However, it is not ruled out that the plastic barrier layer contains a single pigmented layer with a thickness in the range set forth above, i. e. up to 200 μm.

To enhance the recyclability of the at least one at least partially crystallized layer, the at least one at least partially crystallized layer, except for inevitable impurities, only contains polyethylene and the nucleating agent.

As in the case of the pigmented layer, the polyethylene of the at least one at least partially crystallized layer contains or consists of high density polyethylene. Again HDPE is understood to be polyethylene with a density in the range of 0.941 to 0.970 g/cm$^3$.

Preferably, the polyethylene, in particular the HDPE is bimodal, as nucleating agents usually achieve the largest modification in the crystallization behavior of polyethylene, in particular of HDPE, when the polyethylene is bimodal. However, it is not excluded that non-bimodal polyethylene is used for the polyethylene material of the at least partially crystallized layer.

The polyethylene material of the at least partially crystallized layer, in particular as HDPE, preferably has a melt index in the range of 0.3 to 8.5 g per 10 min.

Alternatively, the polyethylene material of the at least partially crystallized layer can be a blend of polyethylene material of different densities and different melt indices. For example, a preferred blend for the polyethylene material of the at least partially crystallized layer may comprise HDPE with a melt index of 0.3 to 0.96 g per 10 min with a weight share of between 50 to 75% by weight of the at least one at least partially crystallized layer, and may further comprise at least one of HDPE with a melt index of 0.97 to 8.5 g per 10 min with a weight share of between 20 to 45% by weight of the at least one at least partially crystallized layer and MDPE with a density of 0.930 to 0.940 g/cm$^3$ with a weight share of between 20 to 45% by weight of the at least one at least partially crystallized layer. The weight percentages of HDPE with a melt index of 0.97 to 8.5 g per 10 min, and at least one of HDPE with a melt index of 0.97 to 8.5 g per 10 min and MDPE and of the nucleating agent in the at least one at least partially crystallized layer, together with inevitable impurities amount to a total of 100% of the weight of at least one at least partially crystallized layer.

So even if the polyethylene material of the at least partially crystallized layer only is comprised of HDPE, this HDPE may be blended by at least two different HDPE materials which differ in their melt index.

A single at least partially crystallized layer can have a thickness in the range from 8 to 200 μm. Preferably, an at least partially crystallized film may be used that is composed of a plurality, i. e. two or more single at least partially crystallized layers, if an at least partially crystallized layer with a thickness larger than 40 μm is desired. The plurality of single at least partially crystallized layers may be coextruded to form the at least partially crystallized film, with each single at least partially crystallized layer of the film having a thickness in the range of 8 to 30 μm, preferably in the range of 8 to 20 μm.

Preferred over the coextrusion of two or more at least partially crystallized layers is the lamination of individual at least partially crystallized layers to one another or to another layer of the plastic barrier laminate. Two at least partially crystallized layers can be laminated by the interposition of an adhesive layer, which can be an extruded polyethylene layer. Likewise, two pigmented layers can be laminated by the inter-position of an adhesive layer, which can be an extruded polyethylene layer. The same is true for the lamination of an at least partially crystallized layer and a pigmented layer. However, since all mentioned layers are based on the same polymer, in the present case polyethylene, an at least partially crystallized layer may as well be coextruded with the pigmented layer.

In order not only to enhance the recyclability of individual layers of the plastic barrier laminate, but of the entire plastic barrier laminate as such, the plastic barrier laminate preferably consists to at least 90% by weight, preferably to at least 93% by weight, still more preferably to at least 95% by weight of polyethylene. Varietal purity is crucial for recyclability. The purer the polymers of a laminate are present in terms of different monomers used for forming the polymers by polymerization, the easier the laminate is to recycle.

According to most jurisdictions at the time of filing of this application, a laminate consisting to at least 90% by weight of polymers that are based on the same monomer can be regarded and treated as monomaterial and can be processed as such in recycling streams.

If the barrier properties achieved with the at least one at least partially crystallized layer and the at least one pigmented layer are still deemed insufficient, the plastic barrier laminate additionally may comprise a gas, preferably oxygen, transmission barrier polymer layer. A suitable gas barrier polymer may comprise at least one of ethylene vinyl alcohol (EVOH) and polyvinyl alcohol (PVOH). The gas barrier polymer layer can be bonded to other layers of the plastic barrier laminate by adequate tie layers, depending on the gas barrier polymer on the one hand and depending on the material of the plastic barrier laminate on the other hand. Maleic anhydride grafted polymers are possible tie layer materials to bond EVOH or PVOH to a polyethylene layer.

Barrier polymers as EVOH and PVOH are preferred since they can be applied as very thin layers with a thickness in one-digit range of µm.

Consequently, for the reasons set forth above, the plastic barrier laminate discussed in the present application is preferably free of conventional barrier layers, like metal foil layers, in particular aluminum layers, and polyamide layers.

Again, the plastic barrier laminate may contain at least two at least partially crystallized layers as defined above. Then the gas barrier polymer layer is preferably arranged between two of the at least two at least partially crystallized layers. As in the above discussed case with at least two at least partially crystallized layers in relation to the pigmented layer, the two at least partially crystallized layers preferably sandwich the gas barrier polymer layer between them in the stacking direction of the plastic barrier laminate.

Additionally or alternatively, the plastic barrier laminate may contain at least two pigmented layers, each preferably realized as defined above. Then the gas barrier polymer layer is preferably arranged between the at least two pigmented layers.

One at least partially crystallized layer and one pigmented layer according to the above specification are a minimum precondition to form a plastic barrier laminate of the present invention. The plastic barrier laminate may contain additional layers that neither contain nucleating agents nor pigments. The plastic barrier laminate may contain on at least one of its exposed sides a polymer layer made of a sealable polymer. In order not to compromise the recyclability of the plastic barrier layer the at least one sealable layer is made of polyethylene.

The plastic barrier laminate preferably has an overall thickness of between 50 µm and 400 µm, preferably in the range of between 100 µm and 230 µm.

The plastic barrier laminate discussed in the present application is suitable to form any sort of packaging, as for example pouches and flow packs. A particular application conceived for the presently discussed plastic barrier laminate is the formation of tube containers having a tube body formed out of the plastic barrier laminate as it is described above, which tube body is connected at one longitudinal end to a shoulder part with a neck and an opening and with the shoulder part often being formed not out of a flexible film, but by injection molding. At the opposite longitudinal end, distant from the shoulder part, the tube body can either be sealed by sealing portions of the exposed inside surface of a preferably sealable innermost layer to one another, or the tube body can have a separate bottom part bonded to the inner surface of the tube body, preferably by sealing.

The tube body is preferably formed by rolling a piece of plastic barrier laminate to a tube and to seal overlapping edge portions inside-to-outside, or to form a butt joint without overlapping edge portions, but with rim surfaces of edge portions contacting each other, and to seal the contacting rim surfaces in a butt joint.

The present application therefore further relates to a tube body, in particular as described above, for a flexible tube container. The present application is still further related to a tube container as described above, i. e. having a tube body as described above, formed by the plastic barrier layer, and further having a shoulder part connected to the tube body at one longitudinal end thereof. The shoulder part has a neck portion with an opening through which the interior of the tube container is accessible so that any flowable substance stored in the interior of the tube container can be intentionally withdrawn from the tube container through the opening.

These and other objects, aspects, features and advantages of the invention will become apparent to those skilled in the art upon a reading of the Detailed Description of the invention set forth below taken together with the drawings which will be described in the next section.

BRIEF DESCRIPTION OF THE DRAWINGS

The invention may take physical form in certain parts and arrangement of parts, a preferred embodiment of which will be described in detail and illustrated in the accompanying drawings which forms a part hereof and wherein.

DESCRIPTION OF PREFERRED EMBODIMENTS

Figure 1:
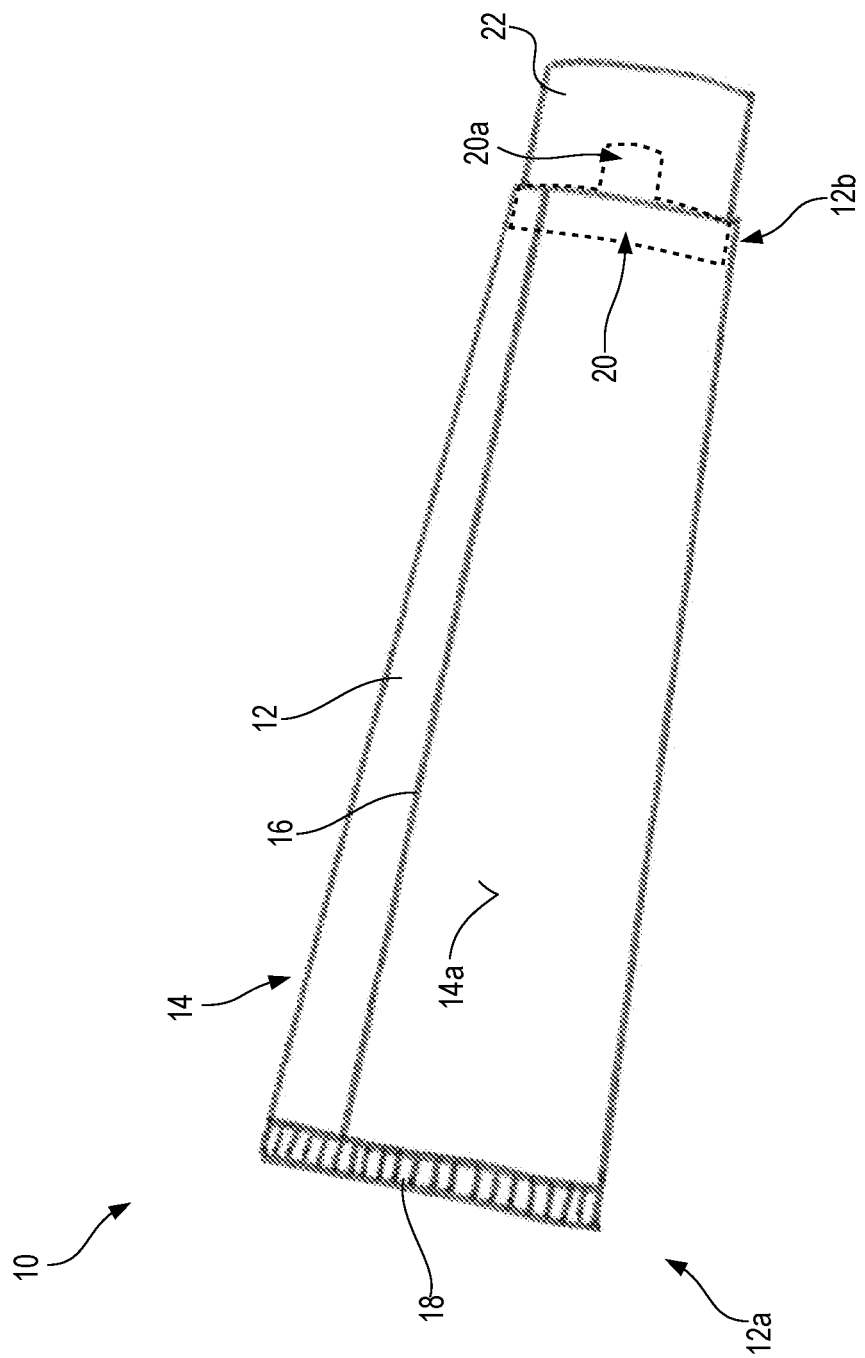
FIG. 1 a schematic perspective view of an exemplary tube container as described above, having a tube body formed of a plastic barrier laminate of the present application, FIG. 2 a schematic sectional view of a first embodiment of the plastic barrier laminate suitable to form the tube body of the tube container of FIG. 1, and FIG. 3 a schematic sectional view of a second embodiment of the plastic barrier laminate also suitable to form the tube body of the tube container of FIG. 1.

Referring now to the drawings wherein the showings are for the purpose of illustrating preferred and alternative embodiments of the invention only and not for the purpose of limiting the same, FIG. 1 depicts in schematic perspective view a tube container that is known in the art as such. The tube container is generally labeled by reference numeral 10. The tube container 10 has a tube body 12, which is known per se, formed of a straight or curved rectangular blank sheet of a plastic barrier laminate 14. The blank sheet of plastic barrier laminate 14 is rolled to a cylindrical or conical tube. The rolled blank sheet is overlapped at its circumferential end portions and the overlapping portions are sealed by a longitudinal seam 16 shown in FIG. 1. The thus formed hollow tube blank is sealed on one longitudinal end 12*a* by sealing opposing inside surface portions of the tube blank, which are facing each other, with each other to form a cross seam 18. Thereby the tube body 12 is received.

"Sealing" in the context of the present application means heat sealing.

On the respective other longitudinal end 12*b* the tube body 12 surrounds a shoulder part 20. The shoulder part 20 is sealed to the inner surface of the tube body 12. The shoulder part 20 has a neck portion 20*a* which has an opening that is not shown in FIG. 1. Through the neck portion 20*a* and its opening content can be released from the tube container 10.

When the tube container is not needed, a cap 22 closes the opening in the neck portion 20*a*. Usually the neck portion 20*a* is formed with an outer thread on and off which the cap 22 can be screwed by an integral sleeve (not shown in FIG. 1) formed inside the cap 22 and having an inner thread formed on its inside.

The shoulder part 20 is drawn in FIG. 1 by dashed lines as it lies behind the tube body 12 and the cap 22 and cannot directly be seen from the observer FIG. 1.

Figure 2:
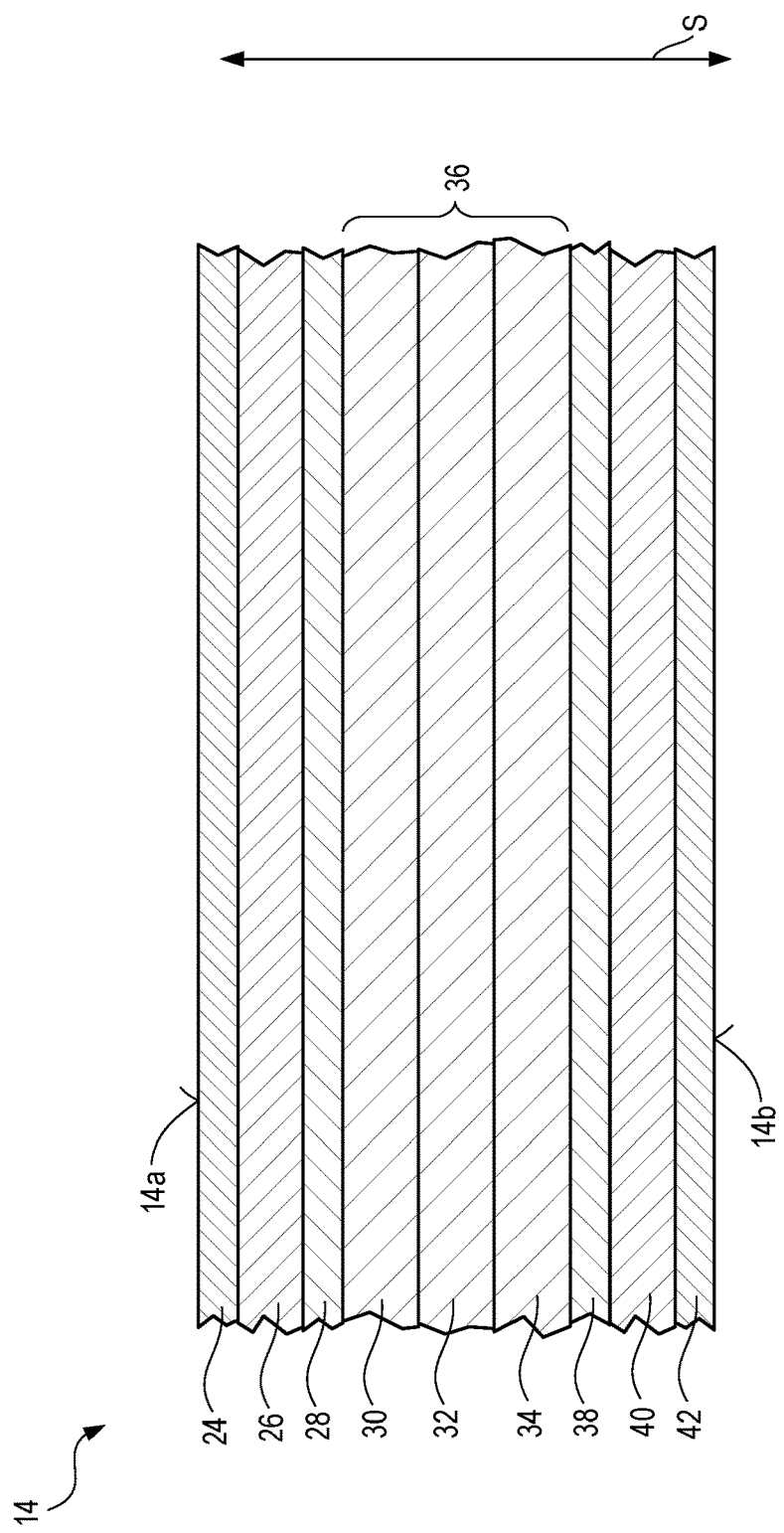

FIG. 2 depicts a schematic cross-section of a first possible embodiment of the plastic barrier laminate 14 suitable to form the tube body 12 of FIG. 1.

The plastic barrier laminate 14 has an exposed outer surface 14a, which forms the outer surface of the tube body 12, and has an exposed inner surface 14b, which forms the inner surface of the tube body 12 and which is in direct contact with the content by which the tube 10 is filled.

The plastic barrier laminate 14 is just exemplary and may contain additional polymer, in particular polyethylene, layers and/or ink layers, the latter being particularly preferably formed by printing.

The outermost layer of the exemplary plastic barrier laminate 14 can be formed by a sealable layer 24 of linear low density polyethylene (LLDPE), preferably in a thickness range from 8 to 30 μm. Besides being sealable, the LLDPE layer 24 provides a glossy outer surface and consequently a good optical appearance. The LLDPE layer 24 can be transparent or can be colored by pigments dispersed in the LLDPE material.

The outermost layer 24 on its side facing towards the later inside of the tube container 10 is bonded to a first moisture vapor transmission rate barrier layer 26.

This first MVTR barrier layer 26 contains an HDPE material as a first PE material with a share of 63% by weight related to the entire weight of the first MVTR layer 26. The HDPE material has a melt index of 0.75 g per 10 min. The first MVTR barrier layer 26 contains a MDPE material as a second PE material with a share of also 34% by weight related to the entire weight of the first MVTR layer 26. The shares, in particular of the PE materials are only exemplary and need not be equal by amount.

The first MVTR barrier layer 26 further contains a barrier nucleating agent, for example the nucleating agent "Hyperform® HPN-20E" by Milliken Chemical Company in USA, with a share of 3% by weight related to the entire weight of the first MVTR layer 26. By use of this barrier nucleating agent the HDPE material of the first MVTR barrier layer 26 is largely crystallized, e. g. has a content of crystallized PE of more than 50% by weight. Consequently, the first MVTR barrier layer 26 is an at least partially crystallized layer in the sense of the above introductory portion of this application.

The first MVTR barrier layer 26 has a thickness in the range of 8 to 60 μm, and preferably has a thickness of 10 μm.

Further following from the outside to the inside along the stacking direction S of the plastic barrier layer 14 the plastic barrier layer 14 contains an extruded polyethylene layer 28 serving as a bonding layer to connect the first MVTR barrier layer 26 to a first gas transmission rate barrier layer 30.

The first GTR barrier layer 30 comprises only the MDPE also contained in the first MVTR barrier layer 26. It further comprises a share of 15% by weight of the entire first GTR barrier layer 30 of a flake-shaped silver-colored master batch as available by Ampacet Corporation, USA, under the tradename of "FauxFoil™". This master batch has a pigment content of approximately 35% by weight of the master batch. Consequently, the first GTR barrier layer 30 has share of flake-shaped pigments of about 5.25% by weight related to the entire weight of the first GTR barrier layer 30. Given that the matrix material of the master batch is polyethylene, for example LLDPE, to ensure a proper blend of the master batch with the receiving polymer material, the assumption of equal or at least very similar densities of the master batch on the one hand and of the receiving MDPE material on the other hand is adequate. Consequently, the flake-shaped pigment content of the first GTR barrier layer 30 can with sufficient certainty be calculated by multiplying the pigment content of the master batch by the master batch content of the first GTR barrier layer 30.

The content of the second HDPE material within the first GTR barrier layer 30 is 85% by weight related to the entire weight of the first GTR barrier layer 30, so that the second HDPE material, the flake-shaped pigments and the matrix material of the master batch add up to a total of 100% per weight.

The first GTR barrier layer 30 has a thickness in the range of 10 to 40 μm, and preferably has a thickness of 14 μm.

In the stacking direction S, on the side facing away from the bonding PE layer 28 a second GTR barrier layer 32 and a third GTR barrier layer 34 are arranged. The second and third GTR barrier layers 32 and 34, to facilitate the explanation, are identical to the first GTR barrier layer 30. However, the second and third GTR barrier layers 32 and 34 may differ in at least one of thickness, MDPE content and HDPE content, melt index and pigment content within the given ranges above in the introductory portion.

The first to third GTR barrier layers 30, 32 and 34 in the present example are coextruded and together form a GTR barrier film 36.

On the side facing away from the second GTR barrier layer 32 another extruded bonding layer 38 of PE is extruded, in order to bond a second MVTR layer 40 to the GTR barrier film 36.

Although not necessarily so, for the present example it is sufficient that the second MVTR layer 40 is identical to the first MVTR layer 26.

The inner surface 14b of the plastic barrier laminate 14 is formed by an innermost sealable HDPE layer 42 that is extruded or laminated to the second MVTR layer 40.

The innermost sealable HDPE layer 42 has a thickness in the range of 20 to 40 μm, and preferably has a thickness of 30 μm.

Instead of the sealable HDPE layer, the innermost layer 42 could be formed by a layer that is identical to the LLDPE layer 24 which forms the outermost layer of the plastic barrier laminate 10. In this case the construction of the plastic barrier laminate 10 would be mirror symmetrical with respect to the central layer, which is the second GTR barrier layer 32.

The plastic barrier laminate 14 has an oxygen transmission rate of less than 0.1 cm$^3$/(m$^2$·d) according to ASTM D 3985-02, in a test environment of 23° C. and 0% relative humidity. It further has a water vapor transmission rate of less than 1.0 g/(m$^2$·d) according to ASTM F 1249-01 in a test environment of 38° C. and 90% relative humidity.

The plastic barrier laminate 14 is free of metal foil and is further free of polyamide, and besides inevitable impurities only contains polyethylene as polymer. It is therefore easy to recycle and can be treated as monomaterial in a recycling process.

Figure 3:
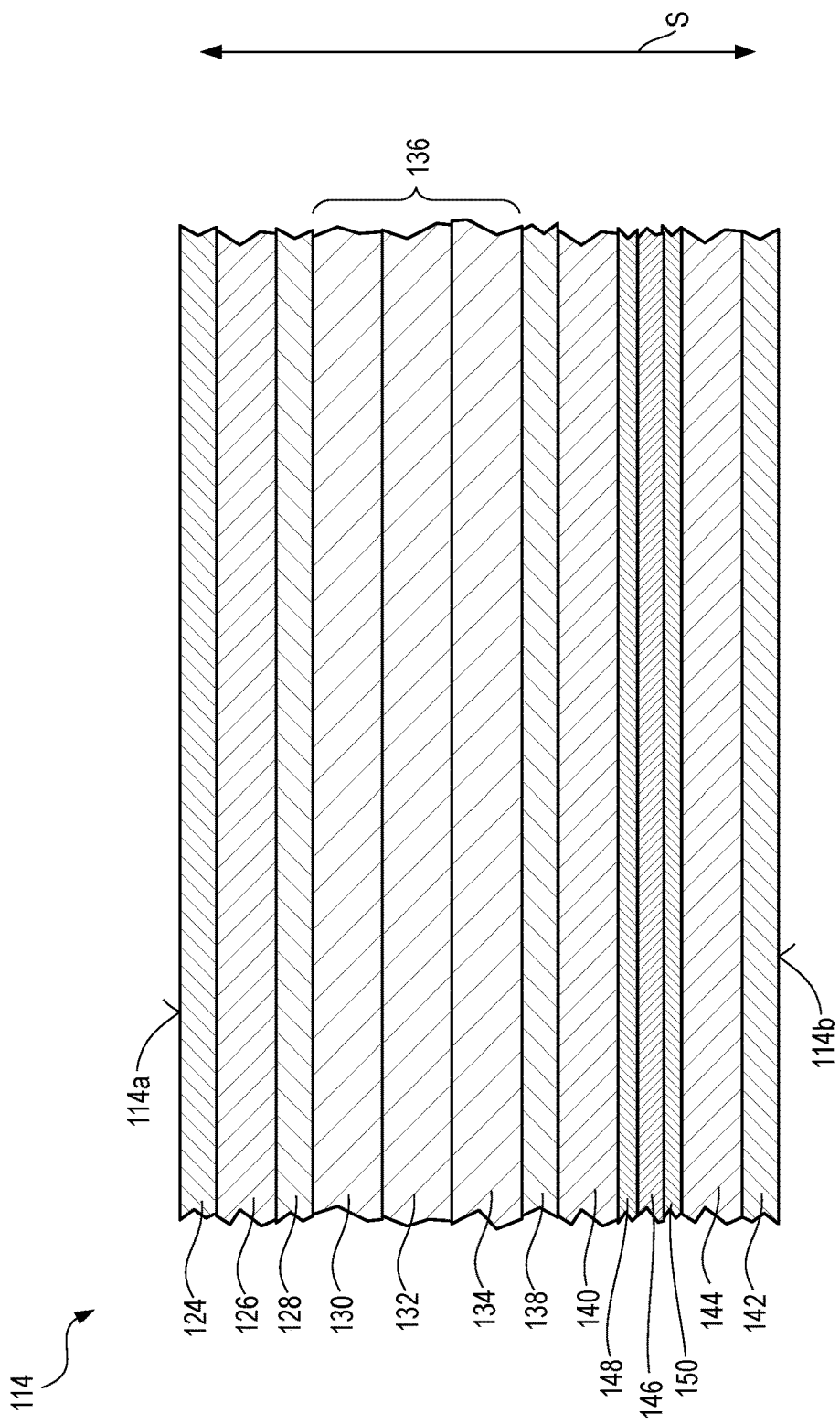

FIG. 3 shows a second embodiment of the plastic barrier laminate 114 that is suitable to form the tube body 12 of FIG. 1.

Features that are identical in structure and/or function to features of FIG. 2 are labeled with the same reference numerals in FIG. 3, but in the number space from 100 to 199. The second embodiment of FIG. 3 will in the following be explained only to the extent to which it differs from the first embodiment of FIG. 2. The explanation of FIG. 2 otherwise applies also to FIG. 3 with regard to the features labeled with the same reference numerals but increased by 100.

The plastic barrier laminate 114 differs from the plastic barrier laminate 14 in FIG. 2 in that it has a third MVTR barrier layer 144, which is identical to the first and second MVTR barrier layers 126 and 140. For that reason reference is made to the above explanation of the first MVTR barrier layer 26 which also applies to each MVTR barrier layer 126, 140 and 144.

Between the second and third MVTR barrier layers 140 and 144, respectively, an additional gas barrier polymer layer 146 made of ethylene vinyl alcohol copolymer (EVOH) is arranged. The additional gas barrier polymer layer 146 is bonded to the second MVTR barrier layer 140 by a first tie layer 148 of maleic anhydride grafted polyethylene and is bonded to the third MVTR barrier layer 144 by a second tie layer 150 which is identical to the first tie layer 148.

The additional gas barrier polymer layer 146 has a thickness in the range of 5 to 9 µm, and has a preferred thickness of 7 µm. the tie layers 148 and 150 have a thickness in the range of 2 to 6 µm, and have a preferred thickness of 4 µm.

By additionally providing the additional gas barrier polymer layer 146 and the third MVTR barrier layer 144, the gas transition barrier properties and the moisture vapor transmission barrier properties can be further enhanced compared to the first embodiment in FIG. 2. Additionally providing the third MVTR barrier layer 144 improves prevailingly the moisture vapor transmission barrier properties of the plastic barrier laminate 114, additionally providing the additional gas barrier polymer layer 146 improves prevailingly the gas transmission barrier properties.

While considerable emphasis has been placed on the preferred embodiments of the invention illustrated and described herein, it will be appreciated that other embodiments, and equivalences thereof, can be made and that many changes can be made in the preferred embodiments without departing from the principles of the invention. Furthermore, the embodiments described above can be combined to form yet other embodiments of the invention of this application. Accordingly, it is to be distinctly understood that the foregoing descriptive matter is to be interpreted merely as illustrative of the invention and not as a limitation.

The invention claimed is:

1. A plastic barrier laminate comprising at least one at least partially crystallized layer containing polyethylene and a nucleating agent, and at least one pigmented layer containing polyethylene and a portion of flake-shaped pigments, wherein the portion of pigments is in the range from 3.0% by weight to 8.0% by weight relative to the weight of the at least one pigmented layer, wherein at least 50% of the polyethylene content of the at least one partially crystallized polyethylene layer are crystallized.

2. The plastic barrier laminate according to claim 1, wherein the plastic barrier laminate contains at least two at least partially crystallized layers, each of these layers containing polyethylene and a nucleating agent, wherein at least one of the at least one pigmented layer is arranged between the at least two at least partially crystallized layers.

3. The plastic barrier laminate according to claim 1, wherein the plastic barrier laminate contains at least two pigmented layers, each of these pigmented layers containing polyethylene and a portion of flake-shaped pigments, wherein the portion is in the range from 3.0% by weight to 8.0% of weight relative to the weight of the respective pigmented layer, wherein at least one of the at least one at least partially crystallized layer is arranged between the at least two pigmented layers.

4. The plastic barrier laminate according to claim 1, wherein the at least one pigmented layer consists essentially of polyethylene and flake-shaped pigments.

5. The plastic barrier laminate according to claim 1, wherein the polyethylene of the at least one pigmented layer contains at least one of the following polyethylene materials:
high density polyethylene
medium density polyethylene
a blend of high density and medium density polyethylene.

6. The plastic barrier laminate according to claim 1, wherein the polyethylene of the at least one pigmented layer consists of at least one of the following polyethylene materials:
high density polyethylene
medium density polyethylene
a blend of high density and medium density polyethylene.

7. The plastic barrier laminate according to claim 1, wherein at least one of the at least one pigmented layer contains two different types of polyethylene which differ in their density.

8. The plastic barrier laminate according to claim 1, wherein the at least one at least partially crystallized layer consists essentially of polyethylene and the nucleating agent.

9. The plastic barrier laminate according to claim 1, wherein the polyethylene of the at least one at least partially crystallized layer contains high density polyethylene.

10. The plastic barrier laminate according to claim 1, wherein the polyethylene of the at least one at least partially crystallized layer consists of high density polyethylene.

11. The plastic barrier laminate according to claim 1, wherein the plastic barrier laminate consists of at least 90% by weight of polyethylene.

12. The plastic barrier laminate according to claim 1, wherein the plastic barrier laminate consists of at least 95% by weight of polyethylene.

13. The plastic barrier laminate according to claim 1, wherein the plastic barrier laminate contains a plurality of pigmented layers, each of these pigmented layers containing polyethylene and a portion of flake-shaped pigments, wherein the plurality of pigmented layers are arranged immediately subsequent to one another in a stacking direction of the plastic barrier laminate, in which the layers of the plastic barrier laminate are stacked to form the multi-layer plastic barrier laminate.

14. The plastic barrier laminate according to claim 1, wherein the at least one at least partially crystallized layer contains 1.5% by weight to 5% by weight of the nucleating agent relative to the weight of the partially crystallized layer.

15. The plastic barrier laminate according to claim 14, wherein the plastic barrier laminate contains at least two at least partially crystallized layers, each of these layers containing polyethylene and a nucleating agent, wherein at least one of the at least one pigmented layer is arranged between the at least two at least partially crystallized layers.

16. The plastic barrier laminate according to claim 1, wherein the plastic barrier laminate additionally comprises a gas transmission barrier polymer layer.

17. The plastic barrier laminate according to claim 16, wherein the plastic barrier laminate contains at least two at least partially crystallized layers, each of these layers containing polyethylene and a nucleating agent, wherein the gas barrier polymer layer is arranged between two of the at least two at least partially crystallized layers.

18. The plastic barrier laminate according to claim 1, wherein the plastic barrier laminate additionally comprises an oxygen transmission barrier polymer layer wherein the oxygen transmission barrier polymer comprises at least one of ethylene vinyl alcohol and polyvinyl alcohol.

19. The plastic barrier laminate according to claim 16, wherein the plastic barrier laminate contains at least two pigmented layers, each of these pigmented layers containing polyethylene and a portion of flake-shaped pigments, wherein the portion is in the range from 3.0% by weight to 8.0% of weight relative to the weight of the respective pigmented layer, wherein the gas barrier polymer layer is arranged between the at least two pigmented layers.

20. A tube body for a flexible tube container, comprising or being formed of the plastic barrier laminate according to claim 1.

* * * * *